United States Patent [19]

Doane

[11] Patent Number: 4,810,026

[45] Date of Patent: Mar. 7, 1989

[54] VEHICLE ARM REST

[76] Inventor: Leland R. Doane, 1786 - 36th Ave., San Francisco, Calif. 94122

[21] Appl. No.: 125,947

[22] Filed: Nov. 27, 1987

[51] Int. Cl.$^4$ ............................................... B60J 9/00
[52] U.S. Cl. .................................. 296/153; 296/37.13; 297/413; 108/46
[58] Field of Search ........................... 296/153, 37.13; 248/118; 108/46; 312/235 A; 297/412, 413, 422, 117

[56] References Cited

U.S. PATENT DOCUMENTS

| | | | |
|---|---|---|---|
| 1,374,907 | 4/1921 | Cofrode | 296/153 |
| 1,426,787 | 8/1922 | Spencer | 297/413 |
| 1,695,549 | 12/1928 | Hausler | 296/153 X |
| 1,715,862 | 6/1929 | Payton | 297/413 |
| 1,742,447 | 1/1930 | McKeag | 296/153 |
| 1,760,450 | 5/1930 | Taylor | 296/153 |
| 1,873,414 | 8/1932 | Jarvis | 297/413 |
| 1,964,500 | 6/1934 | Breiding et al. | 108/46 |
| 1,984,855 | 12/1934 | Zwierzina | 296/153 X |
| 2,569,436 | 10/1951 | Allen | 296/153 |
| 2,577,561 | 12/1951 | Atwater | 296/153 |
| 2,789,862 | 4/1957 | Boyer | 296/153 |
| 3,037,639 | 6/1962 | Kost | 108/46 |
| 3,118,704 | 1/1964 | Meserve | 312/235 A |
| 3,603,637 | 9/1971 | DePinto | 296/153 |
| 4,592,584 | 6/1986 | White, Jr. | 296/153 |

Primary Examiner—Dennis H. Pedder
Attorney, Agent, or Firm—Thomas R. Lampe; Glen R. Grunewald

[57] ABSTRACT

An arm rest for use with a vehicle door having a window sill defining a slot and a door panel disposed below the window sill, the arm rest including a plurality of spaced support elements for supporting the arm of a vehicle occupant at different levels, a projection positionable within the slot, and a stabilizing element engageable with the door panel.

13 Claims, 2 Drawing Sheets

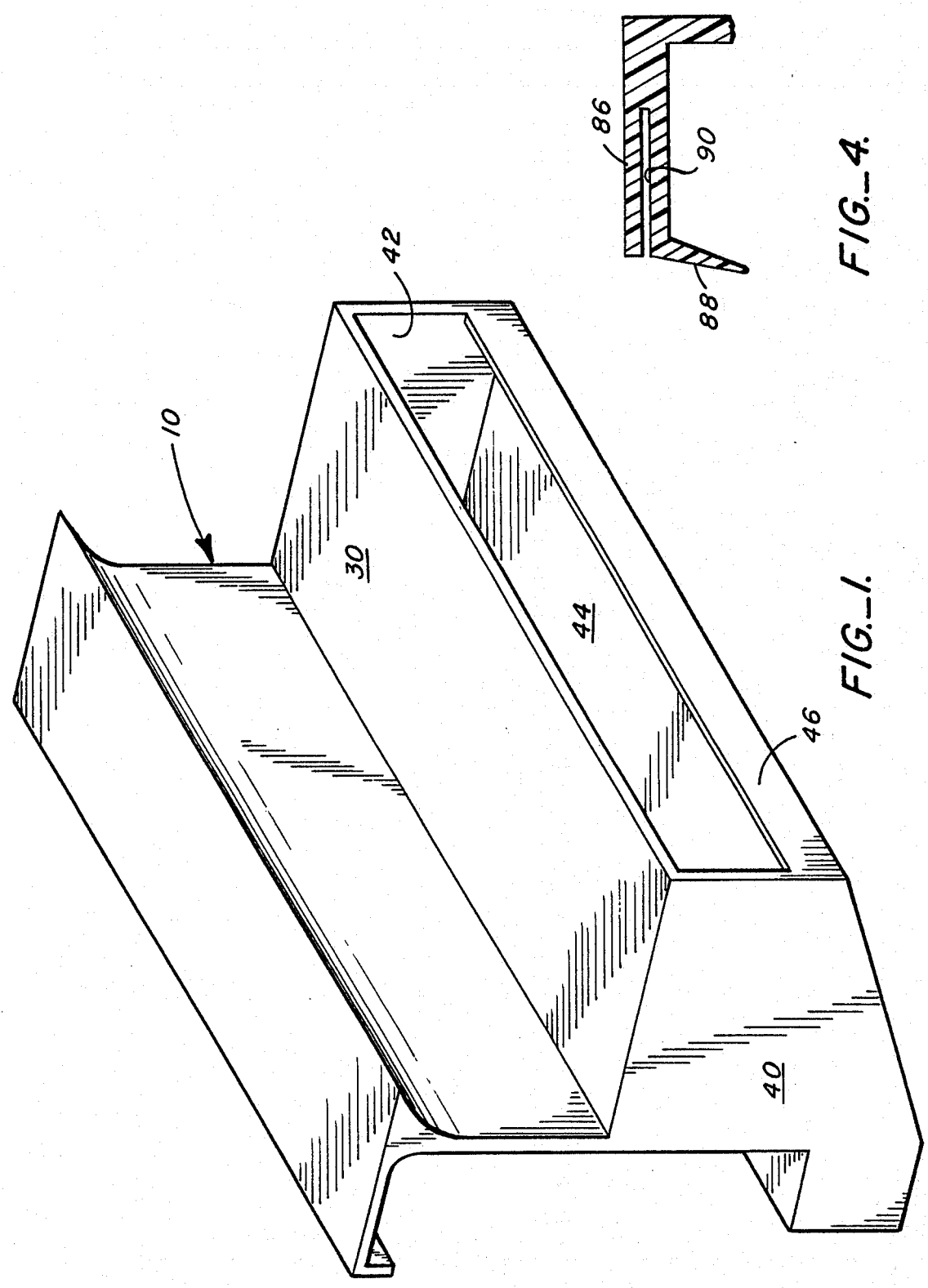

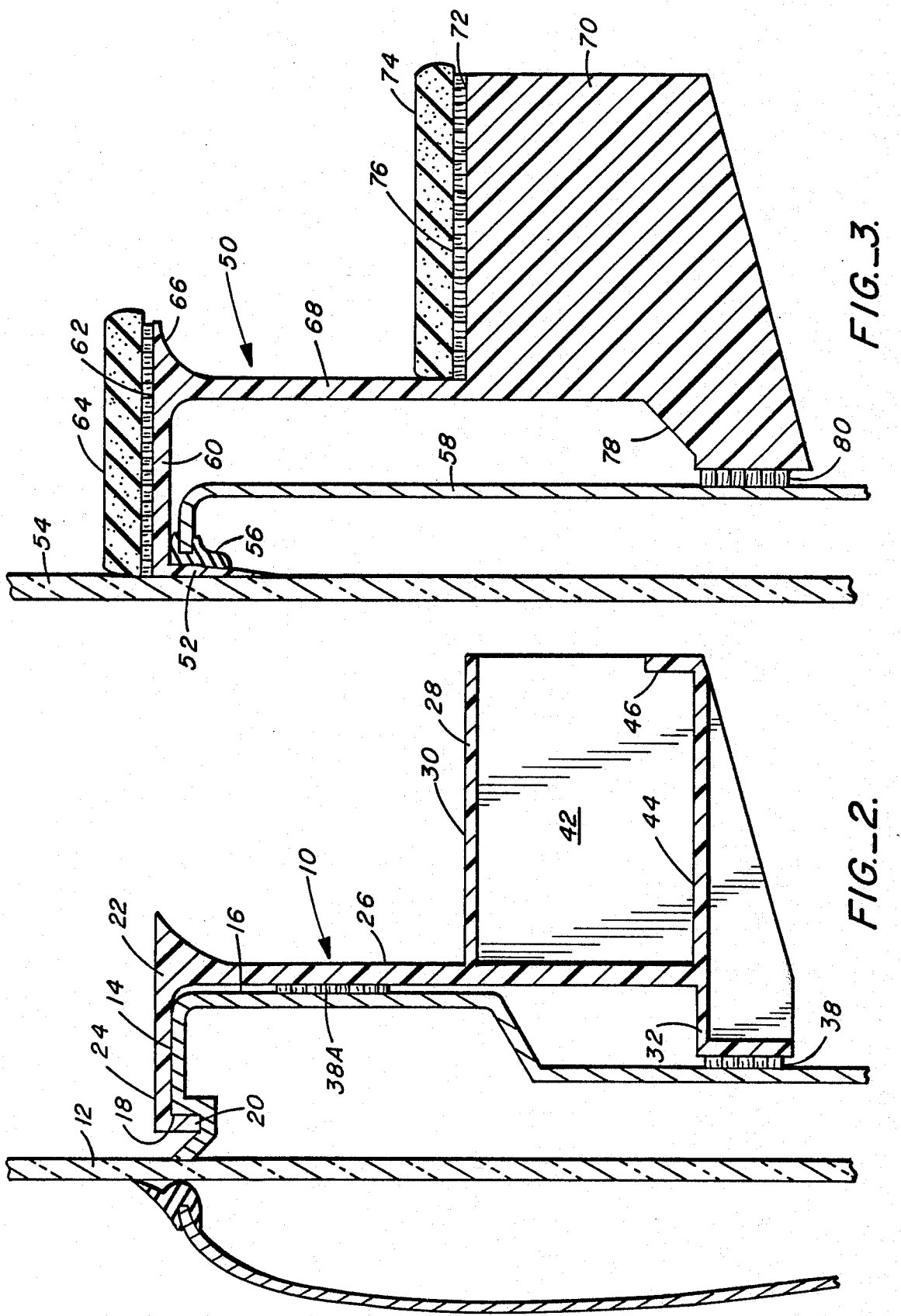

VEHICLE ARM REST

TECHNICAL FIELD

The present invention relates to an arm rest for use by the occupant of a vehicle.

Automobiles and other vehicles are often the sources of discomfort for drivers and other occupants, particularly on trips of extended duration, because most do not provide a comfortable place to rest an arm. This problem is particularly acute for the driver of the vehicle and his or her left arm. The sill of the vehicle's window is not a particularly comfortable place to rest an arm because sills are often narrow as well as hard and unyielding. Some vehicles, of course, have arm rests fixedly attached to the door panels below the windows, but these rests are not always satisfactory because of awkward positioning. Then too, of course, many vehicles provide no arm rest at all.

BACKGROUND ART

A number of prior attempts have been made to devise arm rests to solve the aforementioned difficulties. More particularly, a wide variety of arm rest constructions have been devised. Most such constructions relate to arm rests which hang or are otherwise dependent from the window frame of a vehicle door. Representative of these are the arm rests shown in U.S. Pat. Nos. 1,695,549, 1,715,862, 1,760,450, 1,873,414, 1,984,855, 2,569,436, 2,577,561, 3,603,637 and 4,592,584.

The aforementioned prior art arm rest arrangements have several deficiencies, one of the most important being the fact that they allow the individual to rest his or her arm at only one level. While some of the patents show arrangements which allow adjustment of the arm rest to different levels, the driver or other vehicle occupant does not have the option of positioning his or her arm at different levels on the arm rest once such adjustment has been made.

DISCLOSURE OF THE INVENTION

The arm rest of the present invention allows the driver or other vehicle occupant to position his or her arm at more than one level on the arm rest without making any adjustments to the device. Further, the arm rest of the present invention provides a means whereby the arm rest may be quickly yet securely installed on the vehicle. The arm rest may also be readily removed or repositioned relative to the window sill with a minimum of effort. When in use, the arm rest resists being dislodged from the door to which it is attached due to the unique nature of its construction.

The arm rest of the present invention is adapted for use with a vehicle ldoor, the vehicle door having a window, a window sill defining a slot adjacent to the window, and a door panel below the window sill. The arm rest includes a downwardly extending projection positionable within the slot which, in a preferred embodiment, is the inner groove of the window well seal which is found in most automobiles of modern construction. In another embodiment of the invention, the projection is adapted to be positioned in the actual slot accommodating the window.

A first support element is connected to the projection and adapted to extend away from the window and over the sill, the first support element defining a first arm support surface. A connector element is attached to the first support element and adapted to extend downwardly along the door panel. In a preferred embodiment, a second support element is attached to the connector element at a location spaced from the first support element and defines a second arm support surface. The arm support surfaces are each of a size and configuration to support the arm of a driver or other occupant of the vehicle whereby the arm may be supported at different levels. The arm rest incorporates several other novel features. Among these is a stabilizing element which abuts against the door panel and is continuously urged thereagainst during use.

Selectively engageable attachment elements, which may be in the form of synthetic materials disposed on the stabilizing element and the door panel and adapted to adhere together when pressed together, releasably secure the stabilizing element to the door panel and resist movement of the projection out of the slot.

Other features, advantages, and objects of the present invention will become apparent with reference to the following detailed description and accompanying drawings.

BRIEF DESCRIPTION OF THE DRAWINGS

FIG. 1 is a perspective view of a preferred form of arm rest constructed in accordance with the teachings of the present invention;

FIG. 2 is a cross-sectional view of the arm rest of FIG. 1 showing the arm rest in position on a vehicle door of conventional construction;

FIG. 3 is a view similar to that of FIG. 2 but illustrating an alternative form of arm rest in position on another form of door; and FIG. 4 is a cross-sectional side view of a selected portion of yet another alternative form of arm rest.

BEST MODE FOR CARRYING OUT THE INVENTION

Referring now to FIGS. 1 and 2, an arm rest constructed in accordance with the teachings of the present invention is designated generally by reference numeral 10. In FIG. 2, arm rest 10 is shown positioned on a door of a vehicle, in particular, an automobile. The door, as is conventional, has a window 12, a window sill 14, and a door panel 16 disposed below the sill. Sill 14 defines a slot 18 adjacent to the window, said slot being a groove formed in the vehicle window well seal area of the sill.

Arm rest 10 includes a downwardly extending projection 20 positionable in the slot. A first support element 22 is connected to the projection and extends away from the window 12 and over sill 14, said first support element defining a first arm support surface 24.

A connector element 26 is attached to the first support element 22 and extends downwardly as shown in FIG. 2 along door panel 16. A second support element 28 is attached to connector element 26 at a location spaced below the first support element. Second support element 28 defines a second arm support surface 30 which, as is first support surface 24, of a size and configuration to support the arm of an occupant of a vehicle. The arm of such person may, therefore, be supported at alternative levels as desired. To provide adequate and comfortable arm support, each support surface should have a length in the order of at least 4 inches and a width in the order of at least 2 inches.

Arm rest 10 additionally comprises a stabilizing element adapted to engage the door panel at a predetermined location thereon spaced from sill 14. In the illustrated preferred embodiment, the stabilizing element is a protrusion 32 attached to the remainder of the arm rest at a location below the level of second arm support surface 30, the protrusion 32 and the second support element extending in opposite directions. As illustrated in FIG. 2, protrusion 32 maintains at least a portion of the connector element spaced from the door panel. That is, door panel 16, representative of door panel configurations currently commonly existing, narrows at some point below sill level. Protrusion 32 abuts the door panel at such narrow location.

Preferably, means are provided to releasably attach protrusion 32 to the door panel. One particularly suitable means are synthetic materials which adhere when pressed together and are sold under the trademark "Velcro". One component of such material may be affixed to the door panel while the other cooperating component is affixed to the protrusion 32, said components being interconnected and jointly identified in FIG. 2 by reference numeral 38. If desired, components of similar material may be employed between the enlarged portion of the door panel and connector element 26, as indicated by reference numeral 38A. It will be appreciated that the synthetic material attachment strips stabilize the arm rest relative to the vehicle door and prevent inadvertent displacement of projection 20 either along or out of slot 18. On the other hand, the user can easily disengage the attachment strips to reposition the arm rest or remove it altogether.

Such releasable attachment means, however, are not absolutely necessary since the very configuration of the arm rest itself stabilizes it and resists inadvertent displacement of the projection. Because the arm rest is preferably constructed of plastic, and connector element 26 is relatively rigid, downward force exerted on second arm support surface 30 results in a mechanical moment which will convert the downwardly directed force on second arm support surface 30 to a horizontal force at the location of protrusion 32 toward door panel 16, thus improving the stability of the arm rest.

In the embodiment of the invention shown in FIGS. 1 and 2, second arm support surface 30 comprises the top of a hollow compartment further defined by end walls 40, 42, and bottom wall 44, all of said walls projecting from connector element 26 defining the rearmost extent of the compartment. A lip 46 projects upwardly from bottom wall 44 so that the contents of the compartment will be retained therein.

The form of the arm rest shown in FIGS. 1 and 2 can also be employed in connection with door panels which are not enlarged at the top, such as the door panel illustrated in FIG. 3, since it is not necessary for connector element 26 to engage the panel in order to function properly.

Referring now to FIG. 3, an alternative form of arm rest 50 is illustrated. Arm rest 50 includes a projection 52 tapered to define a wedge-like shape adapted to fit into the slot defined by the vehicle window 54 and the window well seal 56 of door panel 58. Door panel 58 is representative of the types of vehicle panels which do not define a separate slot in its sill spaced from the vehicle window. Projection 52 is wedged into its associated slot and is preferably somewhat resilient to adapt to such placement.

Projection 52 is connected to first support element 60 defining a first arm support surface 62 to which a resilient pad 64 of any suitable type has been secured as by means of "Velcro" strips 66 or the like.

A connector element 68 extends downwardly from first support element 60, said connector element having dependent therefrom second support element 70. On the second arm support surface 72 of second support element 70 is disposed a second pad 74. Again, strips of "Velcro" synthetic material 76 or other suitable expedient may be used to secure the pad to second support element 70. In this embodiment of the invention, second support element 70 is in the form of a solid body preferably constructed, as is the remainder of arm rest 50 (with the possible exception of the pads and "Velcro" attachment strips), of plastic material.

Integrally formed with second support element 70 and extending therefrom toward door panel 58 is protrusion 78 releasably attached to the door panel by "Velcro" strips 80. Except for the pads and "Velcro" strips, arm rest 50 is integrally formed as well as of uniform cross section across the entire length thereof. Thus, the arm rest 50 may be produced quickly and inexpensively through an extrusion process if desired. Also, if desired, a pad such as pads 64 and 74 may cover the vertical portion of connector element 68, and even be integral with pads 64 and 74 as part of a unitary cover.

FIG. 4 shows a portion of another form of arm rest. In this embodiment the first support element 86 is bifurcated at the end thereof attached to projection 88 to form slot 90. This not only provides resilient support for an arm but the slot 90 also may be used to retain an arm rest cover in position if desired.

What is claimed is:

1. An arm rest for use with a vehicle door, said vehicle door having a window, a window sill defining a slot adjacent to said window, and a door panel disposed below said window sill, said arm rest comprising:
   a downwardly extending projection positionable within said slot;
   a first support element connected to said projection and adapted to extend away from said window and over said sill, said first support element defining a first arm support surface;
   a connector element attached to said first support element and adapted to extend downwardly along said door panel; and
   a second support element, said second support element defining a housing with a side opening permitting access thereto, and housing being attached to said connector element at a location spaced from said first support element and defining a second arm support surface, said second support element adapted to extend away from said door panel, and said first and second arm support surfaces each being of a size and configuration to support the arm of an occupant of said vehicle whereby said arm may be supported at different levels.

2. The arm rest of claim 1 additionally comprising a stabilizing element adapted to engage said door panel at a predetermined location thereon spaced from said window sill.

3. The arm rest of claim 2 wherein said stabilizing element is a protrusion attached to the remainder of said arm rest at a location below the level of said second arm support surface, said protrusion and said second support element extending in opposite directions.

4. The arm rest of claim 3 wherein said protrusion is adapted to maintain at least a portion of the remainder of said arm rest spaced from said door panel.

5. The arm rest of claim 4 additionally comprising attachment means for attaching said protrusion to said door panel.

6. The arm rest of claim 5 wherein said attachment means comprises selectively engageable attachment elements on said protrusion and on said door panel which allow positioning of said arm rest at alternative locations on said vehicle door.

7. The arm rest of claim 1 of unitary construction and formed of extruded plastic.

8. The arm rest of claim 1 additionally comprising a resilient pad attached to at least one of said arm support surfaces.

9. The arm rest of claim 1 wherein said slot is partially defined by said window, said projection being tapered, angularly disposed relative to said first support element and toward said window, and adapted to be wedged into said slot and into engagement with said window.

10. The arm rest of claim 1 wherein said slot is a groove formed in the vehicle window sill and said projection is of a size and configuration allowing positioning thereof in said groove.

11. The arm rest of claim 1 wherein said first support element is bifurcated at an end thereof attached to said projection.

12. An arm rest for use with a vehicle door, said vehicle door having a window, a window sill defining a slot adjacent to said window, and a door panel disposed below said window sill, said arm rest comprising:
- a downwardly extending projection positionable within said slot;
- a first support element connected to said projection and adapted to extend away from said window and over and beyond said sill;
- a connector element attached to said support element at a location spaced from said sill and adapted to extend downwardly along said door panel;
- at least one additional support element defining a housing with a side opening permitting access thereto, said housing being attached to said connector element, said support elements defining a plurality of arm support surfaces disposed at different levels; and
- a stabilizing element attached to said connector element and protruding therefrom, said stabilizing element adapted to abut against said door panel and maintain at least a portion of said connector element spaced from said door panel, whereby downward pressure exerted on a support element when said arm rest is positioned on a vehicle door will continuously urge said stabilizing element toward said panel and resist movement of said projection out of said slot.

13. The arm rest of claim 12 wherein the width of said first support element is in the order of at least 2 inches.

* * * * *